(12) United States Patent
Feliss et al.

(10) Patent No.: US 7,187,517 B2
(45) Date of Patent: Mar. 6, 2007

(54) MAGNETIC BRAKE FOR DISK DRIVE

(75) Inventors: Norbert A. Feliss, Sunnyvale, CA (US); Donald Ray Gillis, San Jose, CA (US); Reinhard F. Wolter, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 486 days.

(21) Appl. No.: 10/742,093

(22) Filed: Dec. 19, 2003

(65) Prior Publication Data

US 2005/0135002 A1   Jun. 23, 2005

(51) Int. Cl.
*G11B 19/20* (2006.01)
(52) U.S. Cl. .................. 360/99.08; 360/73.03
(58) Field of Classification Search ............. 360/99.08, 360/73.03, 98.07
See application file for complete search history.

(56) References Cited

U.S. PATENT DOCUMENTS 3,659,170 A * 4/1972 Burkett et al. .............. 318/372
3,665,231 A * 5/1972 Wendler ....................... 310/77
4,090,117 A * 5/1978 Sasamoto et al. ........... 318/365
4,139,874 A * 2/1979 Shiraishi ...................... 360/86
4,646,422 A * 3/1987 McMurtry ..................... 483/1
5,388,094 A * 2/1995 Park ........................... 720/710
6,728,059 B2 * 4/2004 Liu et al. ..................... 360/75

FOREIGN PATENT DOCUMENTS

JP    1-128282 A  *  5/1989
JP    2-79277 A   *  3/1990

* cited by examiner

*Primary Examiner*—Jefferson Evans
(74) *Attorney, Agent, or Firm*—Zilka-Kotab, PC

(57) ABSTRACT

A magnetic brake to prevent rotation of the spindle motor and disk(s). The magnetic brake includes two magnets, one attached to the spindle, clamp, disk, or motor, and the other magnet is coupled to the drive housing or to a movable member. Before the drive is installed in a computer, storage array, etc., the magnet coupled to the housing is removed externally, or the movable member is moved to free rotation of the spindle motor and disk(s). The movable member can also be caused to move automatically when a cable is attached to the drive. An alternate embodiment wraps a wire coil around one of the magnets to counter its magnetism upon energization, freeing the spindle motor and disk(s).

32 Claims, 5 Drawing Sheets

MAGNETIC BRAKE FOR DISK DRIVE

FIELD OF THE INVENTION

The present invention relates to a protective device for hard disk drives, and more particularly, this invention relates to a magnetic brake for selectively preventing rotation of a motor and disk(s) in the drive.

BACKGROUND OF THE INVENTION

Electronic devices are found in all aspects of life. Of particular import are computers, which are found in homes and offices throughout the world. It is now routine to ship computers and computer components long distances, be it factory to retail outlet, factory to consumer, or warehouse to consumer.

One problem that continues to plague computer components is damage from physical shock. Physical shock can occur in many ways. During handling in a factory, retail store, or in a shipping warehouse, a component might be dropped. During transportation, the vehicle carrying the electronic device might encounter potholes and other obstacles which jar the vehicle, translating vibration and shock to the electronic device.

The problems caused by physical shock are even more pronounced in computer components having movable parts. For instance, hard disk drives have many moveable parts. A drop of four inches results in a shock of ~300 G (300 times the force of gravity) to a hard disk drive. Such a shock causes particular damage to the bearing races of the hard disk drive.

Typical disk drives use ball bearings in the races of a spindle supporting the disks as well as the drive motor. FIG. 1 illustrates a detailed view of ball bearings 100 and races 102, 104. The bearings 100 rest against inner and outer races 102, 104. Because the bearings 100 are spherical, they only have one point of contact on each race 102, 104. The bearings 100 are much harder than the races 102, 104. When a disk drive is idle and is jarred, the ball bearing mechanism is more susceptible to damage by a shock and even physical movement. Because the motor is not spinning, the ball bearings 100 are pressed against a race, resulting in lubricant depletion at the point of contact of the ball bearing 100 and the race. Over time, even slight movement of the ball bearing 100 will cause pitting and gauling on the race. When the drive is finally put into use, the pitting and gauling cause an audible click each time a bearing encounters one of these damaged portions. When the drive is activated, the clicking turns into a high frequency audible noise or "whine" that is undesirable.

Another type of bearing is a fluid dynamic bearing (FDB). FIG. 2 illustrates an FDB 200. An FDB is essentially a cylinder 202 inside another cylinder 204, the first cylinder 202 being surrounded by a fluid. At high speeds, the inner cylinder 202 is centered in the outer cylinder 204. However, in a stop condition, the inner cylinder 202 will tend to pivot such that the cylinders 202, 204 contact each other. A physical shock will cause more damage to FDBs than an equivalent shock would cause to a ball bearing structure as the ball bearings tend to distribute the load. In an FDB 200, there is only one point of contact to absorb the energy of the shock. Thus, the damage to the outer cylinder 204 will be more profound. Any scarring of the outer cylinder 204 will cause mechanical interference of the journal bearing. The interference will cause scratching which will ultimately collect debris and will ultimately alter the properties of the fluid, creating instability, i.e., vibration, of the FDB 200.

What is therefore needed is a new device that reduces rotation of the motor and disk(s) of a hard drive to prevent damage to the bearing races caused by rotation of the motor and disk(s) during physical shock.

SUMMARY OF THE INVENTION

The proposed invention provides a magnetic brake in a disk drive to prevent rotation of the spindle motor and disk(s) during shipping, movement, and idle time. The magnetic brake includes two magnets, one attached to the clamp, spindle, disk or motor, and the other coupled to the drive housing or to a movable member. The magnetic brake prevents such things as damage to the bearing races which can cause instability and audible "whine". Before the drive is installed in a computer, storage array, etc., the magnet coupled to the housing is removed externally, or the movable member is moved to free rotation of the disk. The movable member can also be caused to move automatically when a cable is attached to the drive. As an option, a wire coil can be wrapped around one of the magnets to counter its magnetism upon electrically energizing the coil, thereby freeing the disk. In addition, the magnetic brake will force the spindle motor towards the cover of the disk drive which houses the mating magnet. Since the motor bearing is preloaded no movement of the ball bearings will occur in the direction towards the cover and they will remain stationary.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
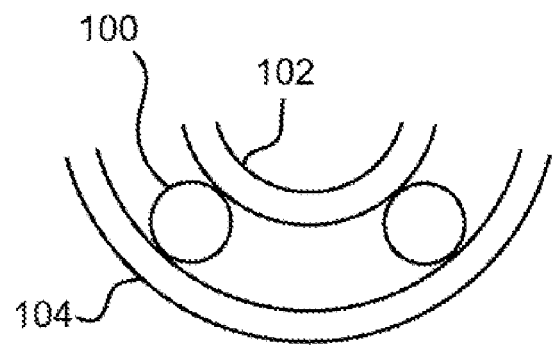
FIG. 1 is a partial view of a ball bearing mechanism.
Figure 2:
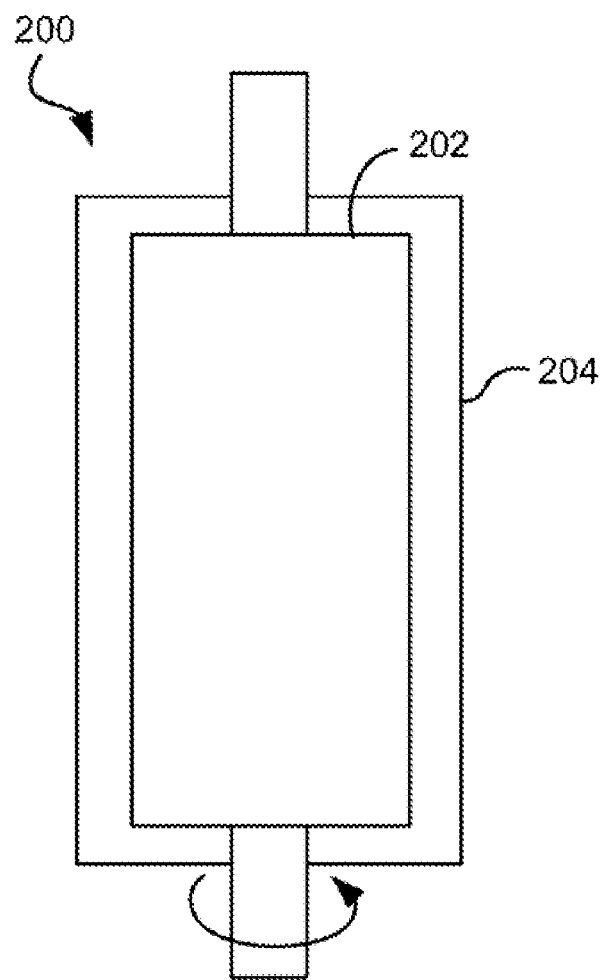
FIG. 2 is a partial view of a fluid dynamic bearing mechanism.
Figure 3:
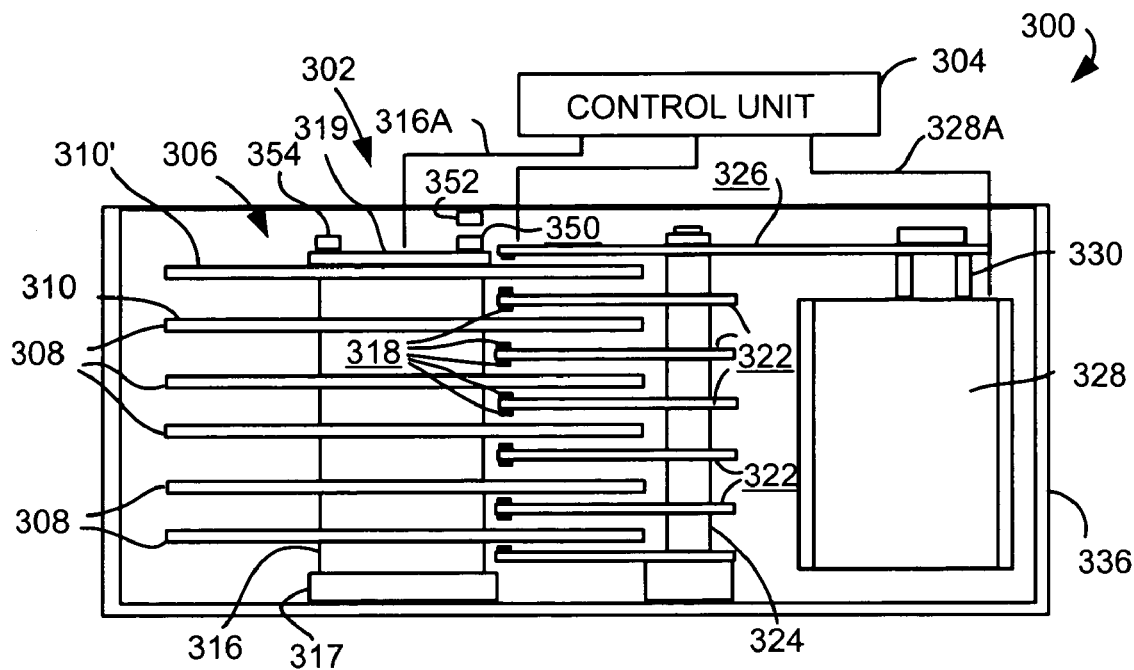
FIG. 3 is a schematic and simplified vertical sectional view of a rigid magnetic disk drive unit embodying the present invention.

FIG. 3 is a cross-sectional diagram of parts of a data storage disk drive system 300 including a rigid magnetic disk drive unit generally designated as 302 and a control unit generally designated as 304. Unit 302 is illustrated in simplified form sufficient for an understanding of the present invention because the utility of the present invention is not limited to the details of a particular drive unit construction. After data storage disk drive system 300 is completely assembled, servo information used to write and read data is written using the disk drive system 300.

Figure 4:
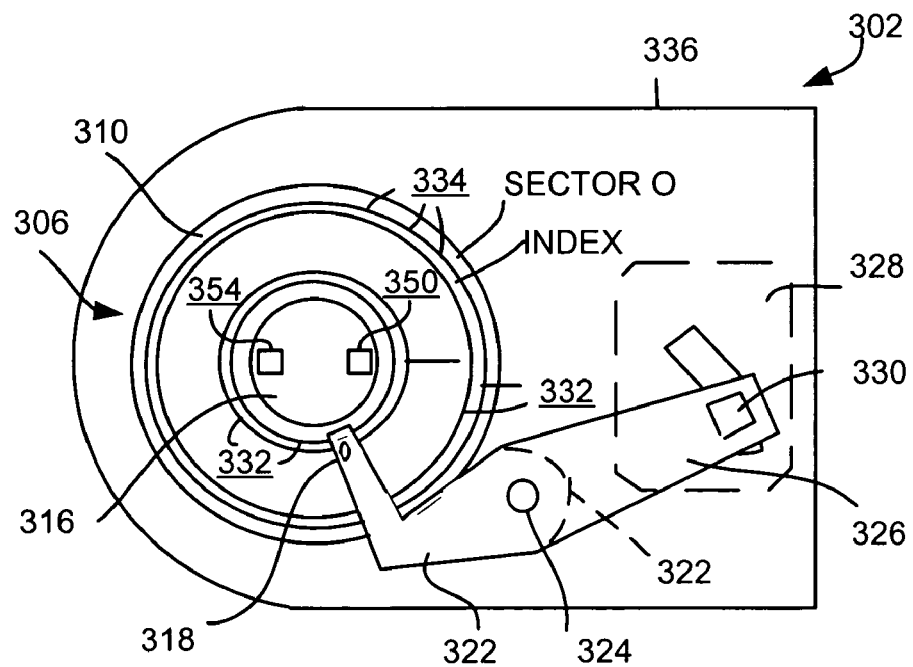
FIG. 4 is a top plan view of the structure shown in FIG. 3.

Referring now to FIGS. 3 and 4 of the drawing, disk drive unit 302 includes a single disk, or as shown, a stack 306 of disks 308 having two magnetic surfaces 310. The disks 308 are mounted in parallel for simultaneous rotation on and by a spindle 316 and motor 317. The spindle 316 includes a clamp 319 that is used in combination with fasteners to provide compression to the disks 308. Data information on each disk 308 are read and/or written to by a corresponding transducer head 318 movable across the disk surface 310. In a disk drive using a dedicated or hybrid servo, one of the disk surfaces 310' stores servo information used to locate information and data on the other disk surfaces 310.

Transducer heads 318 are mounted on flexure springs carried by arms 322 ganged together for simultaneous pivotal movement about a support spindle 324. One of the arms 322 includes an extension 326 driven in a pivotal motion by a head drive motor 328. Although several drive arrangements are commonly used, the actuator motor 328 can include a voice coil motor 330 cooperating with a magnet and core assembly (not seen) operatively controlled for moving the transducer heads 318 in synchronism in a radial direction in order to position the heads in registration with data information tracks or data cylinders 332 to be followed and access particular data sectors 334. Although a rotary actuator is shown, it should be understood that a disk drive with a linear actuator can be used. Data storage disk drive system 300 is a modular unit including a housing 336. The various components of the disk drive system 300 are controlled in operation by signals generated by control unit 304 such as motor control signals on line 316A and position control signals on line 328A.

A first magnet 350 is coupled to the clamp 319 and a second magnet 352 is operatively coupled to the housing such that when the drive is not active, the magnets 350, 352 are coincident each other with opposite poles facing each other. The magnets 350, 352 attract each other and prevent rotation of the spindle motor and disks 308. Alternative placement of the first magnet 350 is on the spindle 316, motor 318, or top or bottom disk 308.

The first magnet 350 can be coupled to the clamp, spindle, motor or disk via an adhesive. The first magnet 350 can also be formed into an injection molded clamp or disk. Preferred placement of the first magnet 350 is towards an outer circumference of the clamp 319, as the farther the first magnet 350 is from the axis of rotation, the more torque is required to break the magnetic coupling of the magnets 350, 352.

The shape of the magnets 350, 352 can vary, and may each have a different shape. Illustrative cross-sectional shapes include round, rectangular, arc-shaped, etc. Arc-shaped magnets are preferred for low-profile designs, as the facing poles of the magnets 350, 352 can be made larger.

The magnetic strength of the magnets 350, 352 does not need to be very strong. All that is required is that the magnets 350, 352 prevent the spindle motor and disks 308 from rotating upon application of a physical event of predetermined energy. Note that the first magnet 350 should not be too strong or it could interfere with the data tracks on the disk or operation of the head.

To avoid the effects of load imbalance, a magnetic or nonmagnetic counterweight 354 can be coupled on the opposite side of the clamp, spindle or motor to balance the rotating mechanism of the drive. Preferably, the first magnet 350 (nearest the disk) has a low mass and low profile to further reduce load imbalance.

When the drive is installed in the computer, one of the magnets is displaced or removed so that the magnetic coupling is no longer present or at least ineffective to alter performance of the drive. Preferably, the second magnet 352 is displaced from alignment with the path of movement of the first magnet 350.

In one embodiment, the second magnet 352 (closest to the housing) is completely removed such as by removing a screw, releasing a clamp, dislodging the magnet 352 from a frictional coupling, etc. A preferred embodiment would have the second magnet 352 positioned on the outside of the housing for easy removal without exposing the interior of the drive to the atmosphere and potential contamination. In this case, either the first or the second magnet would be selected to have adequate magnetic force so that the lines of flux cross through the housing to attract the magnet on the clamp, spindle or motor. Because the drive housing is typically constructed of metal, the magnetic flux crossing through the housing walls will be dampened. To enhance the flux, the portion of the housing near the magnet(s) can be designed to provide reduced resistance to the flux. For example, a piece of plastic or other non-barrier material can be integrated into the frame near the coupling point of the magnet, the metal of the housing can be made more thin near the coupling point of the magnet, etc.

Figure 5A:
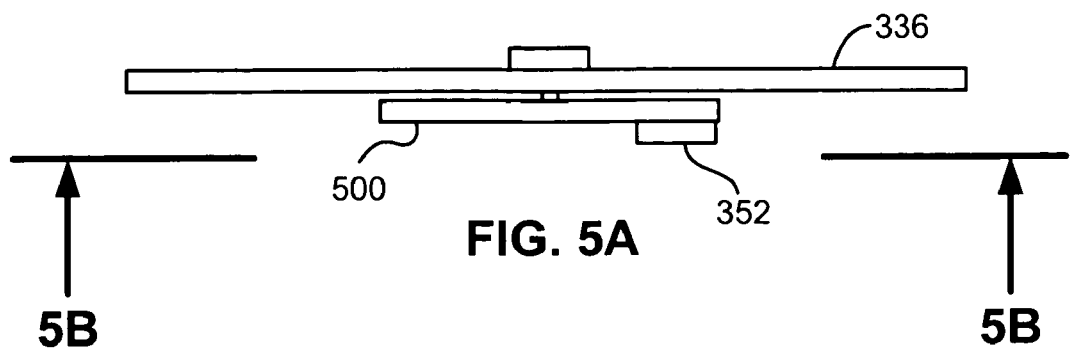
FIGS. 5A–B are partial plan views of a magnet mounted off-center on a rotating member that is coupled to a disk drive housing.
Figure 5B:
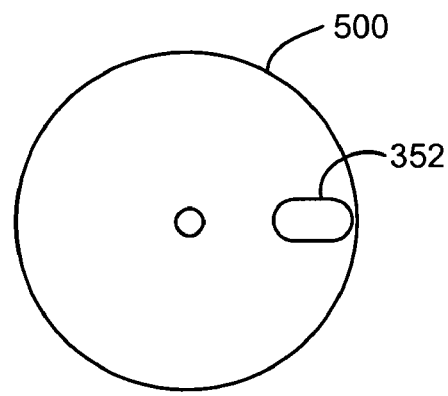

FIGS. 5A–B illustrate another embodiment, where the second magnet 352 is mounted off-center on a rotating member 500 that is coupled to the housing 336. Prior to activation of the drive, the rotating member 500 is rotated via an external knob, screw, etc. to move the second magnet 352 out of alignment with the first magnet 350. When the drive is removed from the computer, the second magnet 352 can be moved back into alignment with the first magnet 350.

Figure 6A:
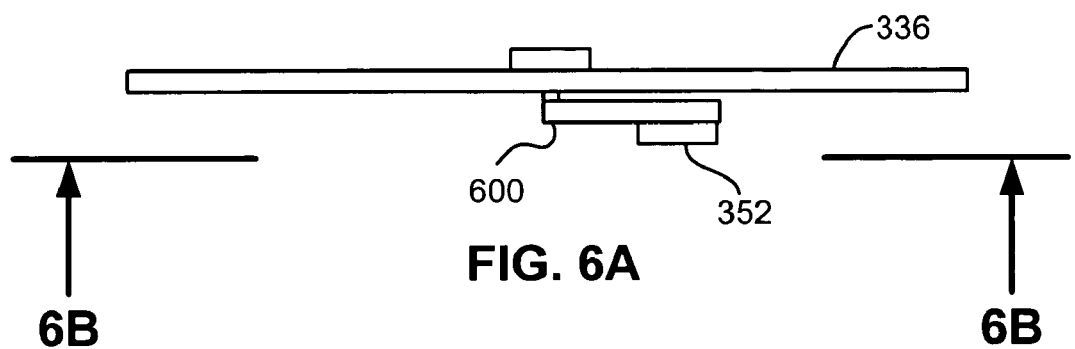
FIGS. 6A–B are partial plan views illustrating a magnet mounted on a pivoting arm.
Figure 6B:
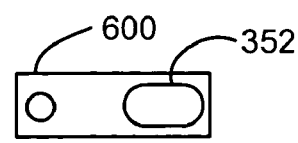

FIGS. 6A–B illustrate an embodiment in which the second magnet 352 is mounted on a pivoting arm 600 off-center with respect to a pivot point of the arm 600. Prior to activation of the drive, the pivoting arm 600 is pivoted via an external knob, screw, etc. to move the second magnet 352 into and out of alignment with the first magnet 350.

Figure 7A:
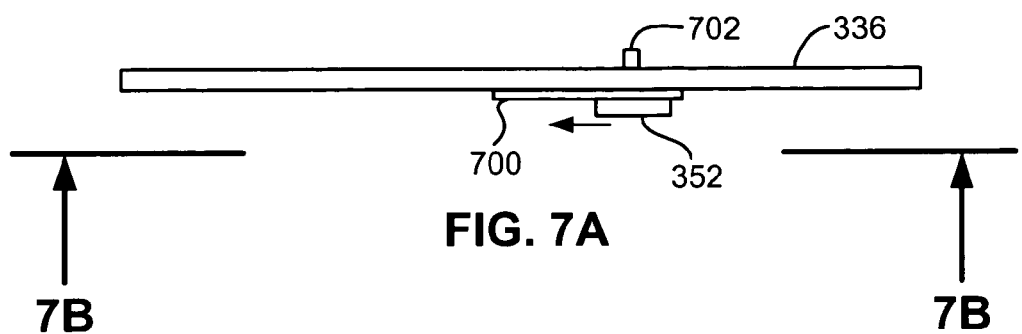
FIGS. 7A–B are partial plan views depicting a magnet mounted to tracks on a disk drive housing.
Figure 7B:
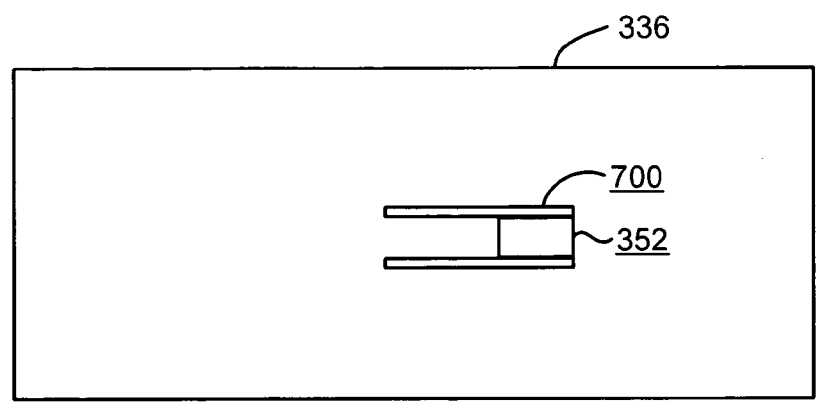

FIGS. 7A–B illustrate a further embodiment in which the second magnet 352 is mounted to tracks 700. Prior to insertion in the drive, the user slides the second magnet 352 out of alignment with the first magnet 350 by moving a slider 702 that extends through the housing 336.

Figure 8A:
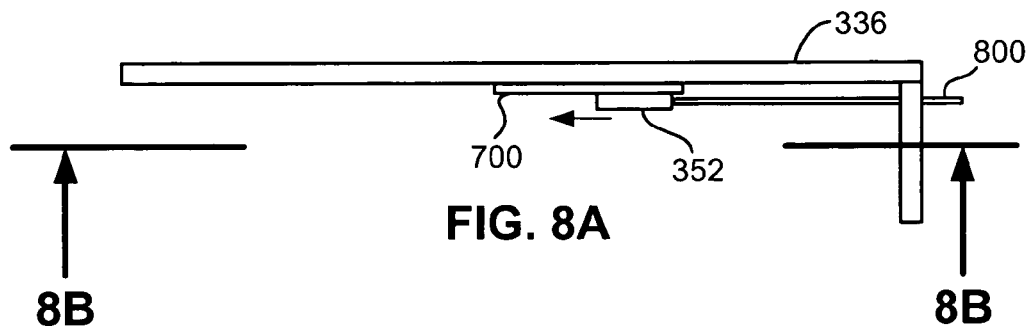
FIGS. 8A–B are partial plan views showing a magnet coupled to a lever or arm that extends from the magnet to the exterior of a hard disk drive.
Figure 8B:
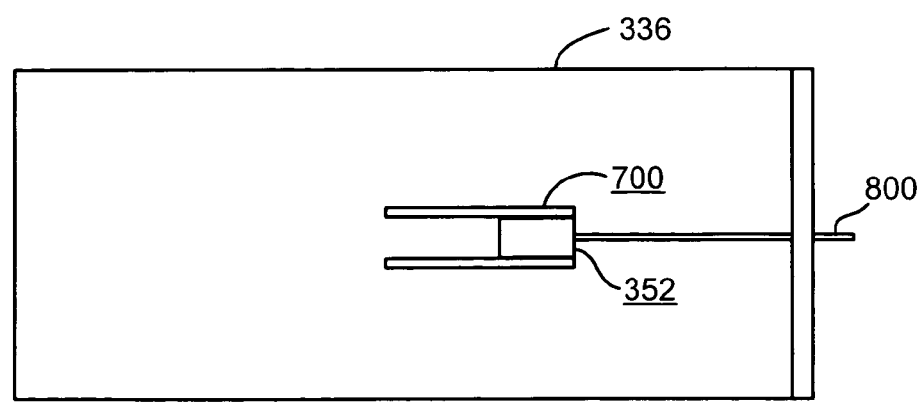

FIGS. 8A–B depict another embodiment, where the second magnet 352 is coupled to a lever or arm 800 that extends from the magnet 352 to the exterior of the drive. The magnet may be suspended by the arm, can be mounted to tracks 700, etc. Prior to activation of the drive, the arm or lever 800 is manipulated to move the magnet 352 out of alignment with the first magnet 350.

Figure 9A:
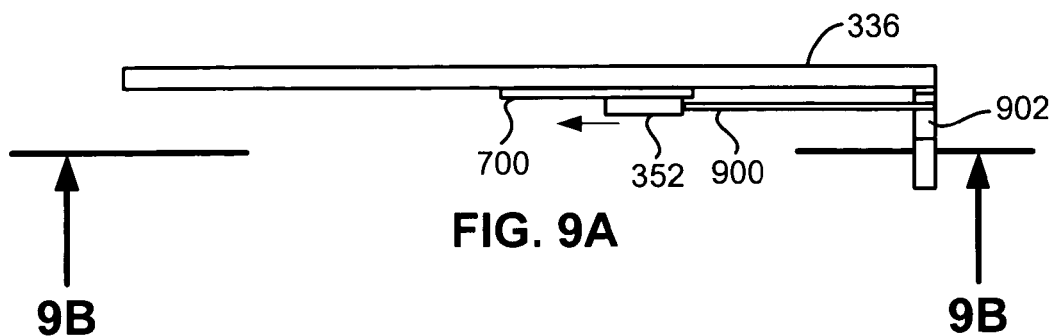
FIGS. 9A–B are partial plan views of a magnet actuating arm that extends into the power or data cable connector socket.
Figure 9B:
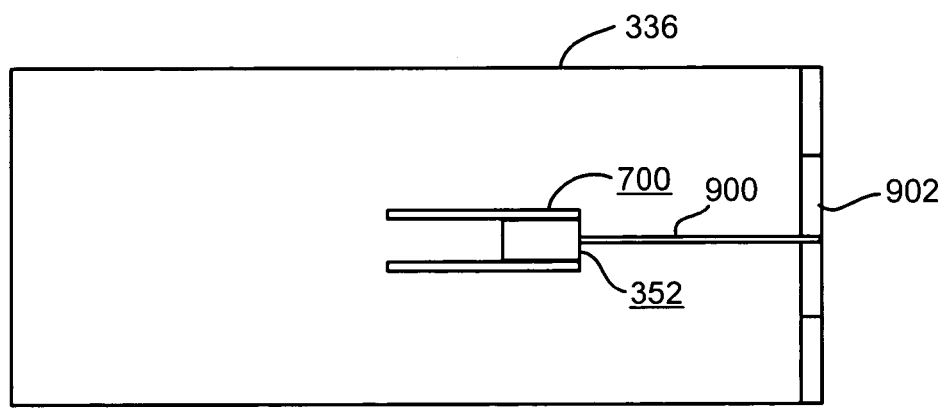

In a variation on the above, shown in FIGS. 9A–B, an arm 900 extends into the power or data cable connector socket 902. When the power cable or data cable is inserted into the socket 902, the arm 900 is actuated automatically to move the second magnet 352 out of alignment with the first magnet 350. Preferably, the second magnet 352 is biased towards an aligned position, so that when the power or data cable is removed, the second magnet 352 realigns with the path of rotation of the first magnet 350.

Figure 10A:
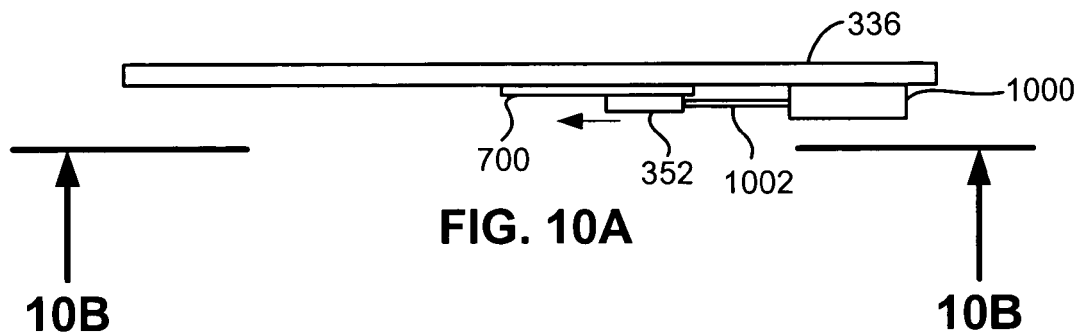
FIGS. 10A–B are partial plan views of an embodiment implementing a solenoid that moves a magnet actuating arm or lever.
Figure 10B:
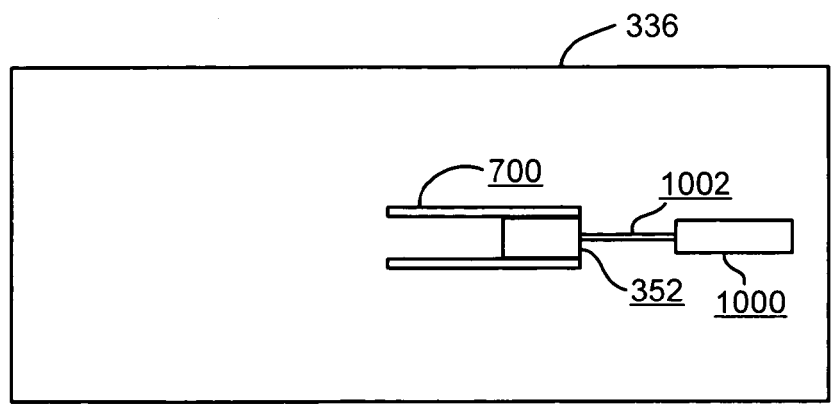

In another variation, illustrated in FIGS. 10A–B, a solenoid 1000 moves an arm or lever 1002 when power is supplied to the drive. This embodiment would prevent rotation of the drive after installation in the end device. The second magnet 352 can be biased towards an aligned position, so that when power is removed, the second magnet 352 will move back into alignment with the path of rotation of the first magnet 350.

Other possible variations include electric actuators that move the magnet via a motor driven ball screw, acme screw, worm screw, belt drive assembly, etc.

An alternative embodiment wraps a wire coil around one of the magnets to counter its magnetism upon electrically energizing the coil, freeing the disk. The power supplied to the coil will be dependent upon the type and strength of magnet to which coupled. The coil can be energized upon initiation of the drive during power up of the computer to which it is attached. For example, the coil can be coupled directly to a transformer coupled to the drive power supply wire so that the coil is automatically energized upon power being supplied to the drive. Preferably, the coil is coupled to the magnet nearest the housing for simplicity of manufacture, with mating contacts between the main housing body and the housing cover if the magnet is coupled to the housing cover. Alternatively, the coil could be coupled to the magnet that is coupled to the clamp, spindle, or motor, with brush-type contacts providing the power to the rotating mechanism.

Components of the various embodiments described herein can be mixed and matched with any other components to obtain the desired results.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device for selectively reducing the probability of rotation of a spindle motor and disk(s) in a disk drive, the disk drive having a disk rotatably coupled to a housing and a spindle motor for rotating the disk, comprising:
   a first magnet coupled to at least one of a spindle, clamp and motor coupled to a disk;
   a second magnet for selectively creating a magnetic coupling with the first magnet for reducing the probability of rotation of the disk; and
   a nonmagnetic counterweight coupled to at least one of the spindle, clamp and motor, the counterweight being for counterbalancing a centrifugal effect of the first magnet.

2. A device for selectively reducing the probability of rotation of a spindle motor and disk(s) in a disk drive, the disk drive having a disk rotatably coupled to a housing and a spindle motor for rotating the disk, comprising:
   a first magnet coupled to at least one of a spindle, clamp and motor coupled to a disk;
   a second magnet selectively creating a magnetic coupling with the first magnet for reducing the probability of rotation of the disk; and
   a magnet counterweight coupled to at least one of the spindle, clamp and motor, the counterweight being for counterbalancing a centrifugal effect of the first magnet.

3. A device for selectively reducing the probability of rotation of a spindle motor and disks) in a disk drive, the disk chive having a disk rotatably coupled to a housing and a spindle motor for rotating the disk, comprising:
   a first magnet coupled to at least one of a spindle, clamp and motor coupled to a disk; and
   a second magnet for selectively creating a magnetic coupling with the first magnet for reducing the probability of rotation of the disk;
   wherein art area of the disk drive housing adjacent the second magnet provides less resistance to magnetic flux passing therethrough than would portions of the disk drive housing surrounding the area.

4. A device as recited in claim 3, wherein the second magnet is positioned outside of the disk drive housing.

5. A device as recited in claim 4, wherein the second magnet is removable.

6. A device as recited in claim 4, wherein the second magnet is selectively displaced from alignment with a path of travel of the first magnet.

7. A device as recited in claim 3, wherein the second magnet is selectively displaced from alignment with a path of travel of the first magnet.

8. A device as recited in claim 3, wherein at least one of the magnets has an arc-shaped cross section taken perpendicular to a face of the magnet facing the other magnet.

9. A device as recited in claim 3, wherein the spindle includes a ball bearing.

10. A device as recited in claim 3, wherein the spindle includes a fluid dynamic bearing.

11. A device for selectively reducing the probability of rotation of a spindle motor and disk(s) in a disk drive, the disk drive having a disk rotatably coupled to a housing and a spindle motor for rotating the disk comprising;
   a first magnet coupled to at least one of a spindle, clamp and motor coupled to a disk; and
   a second magnet for selectively creating a magnetic coupling with the first magnet for reducing the probability of rotation of the disk;
   wherein the second magnet is selectively displaced from alignment with a path of travel of the first magnet,
   wherein the second magnet engages a member operative to displace the second magnet upon attachment of a cable to the disk drive.

12. A device as recited in claim 11, wherein the second magnet is coupled to a rotating member.

13. A device as recited in claim 11, wherein the second magnet is coupled to a pivoting member.

14. A device as recited in claim 13, wherein the actuating member is actuated by a solenoid.

15. A device as recited in claim 11, wherein the second magnet engages an actuating member.

16. A device for selectively reducing the probability of rotation of a spindle motor and disk(s) in a disk drive, the disk drive having a disk rotatably coupled to a housing and a spindle motor for rotating the disk, comprising:
   a first magnet coupled to at least one of a spindle, clamp and motor coupled to a disk; and
   a second magnet for selectively creating a magnetic coupling with the first magnet for reducing the probability of rotation of the disk; and a magnetic coil wrapped around at least one of the magnets, the magnetic coil countering a magnetic effect of the at least one magnet upon energizing the coil.

17. A device for selectively reducing the probability of rotation of a spindle motor and disk(s) in a disk drive, the disk dive having a disk rotatably coupled to a housing and a spindle motor for rotating the disk, comprising;
   a first magnet coupled to at least one of a spindle, clamp and motor coupled to a disks; and
   a second magnet for selectively creating a magnetic coupling with the first magnet for reducing the probability of rotation of the disk;
   wherein the clamp is injection molded, wherein the first magnet is integrated into the injection molded clamp.

18. A device for selectively reducing the probability of rotation of a spindle motor and disk(s) in a disk drive, the disk drive having a disk rotatably coupled to a housing and a motor for rotating the disk comprising:
   a first magnet coupled to at least one of a spindle clamp and motor coupled to a disk; and
   a second magnet for selectively creating a magnetic coupling with the first magnet for reducing the probability of rotation of the disk; and
   a counterweight coupled to the at least one of the spindle, clamp and motor, the counterweight being for counterbalancing a centrifugal effect of the first magnet,
   wherein the second magnet is selectively displaced from alignment with a path of travel of the first magnet.

19. A device as recited in claim 18, wherein the second magnet is positioned outside of the disk drive housing.

20. A device as recited in claim 19, wherein the second magnet is removable.

21. A device as recited in claim 18, wherein the second magnet is coupled to a rotating member.

22. A device as recited in claim 18, wherein the second magnet is coupled to a pivoting member.

23. A device as recited in claim 18, wherein the second magnet engages an actuating member.

24. A device as recited in claim 18, wherein the actuating member is actuated by a solenoid.

25. A device as recited in claim 18, wherein at least one of the magnets has an arc-shaped cross section taken perpendicular to a face of the magnet facing the other magnet.

26. A device as recited in claim 18, wherein the spindle includes a ball bearing.

27. A device as recited in claim 18, wherein the spindle includes a fluid dynamic bearing.

28. A device for selectively reducing the probability of rotation of a spindle motor and disk(s) in a disk drive, the disk drive having a disk rotatably coupled to a housing and a motor for rotating the disk, comprising:
   a first magnet coupled to at least one of a spindle clamp and motor coupled to a disk; and
   a second magnet for selectively creating a magnetic coupling with the first magnet for reducing the probability of rotation of the disk;
   wherein the second magnet is selectively displaced from alignment with a path of travel of the first magnet,
   wherein an area of the disk drive housing adjacent the second magnet provides less resistance to magnetic flux passing therethrough than would portions of the disk drive housing surrounding the area.

29. A device for selectively reducing the probability of rotation motor and disk(s) in a disk drive, the disk drive having a disk rotatably coupled to a housing and a motor for rotating the disk, comprising:
   a first magnet coupled to at least one of a spindle, clamp and motor coupled to a disk; and
   a second magnet for selectively creating a magnetic coupling with the first magnet for reducing the probability of rotation of the disk;
   wherein the second magnet is selectively displaced from alignment with a path of travel of the first magnet,
   wherein the actuating member is actuated by solenoid.
   wherein the second magnet engages a member operative to displace the second magnet upon attachment of a cable to the disk drive.

30. A device for selectively reducing the probability of rotation of a spindle motor and disk(s) in a disk drive, the disk drive having a disk rotatably coupled to a housing and a motor for rotating the disk, comprising:
   a first magnet coupled to at least one of a spindle, clamp and motor coupled to a disk; and
   a second magnet for selectively creating a magnetic coupling with the first magnet for reducing the probability of rotation of the disk;
   wherein the second magnet is selectively displaced from alignment with a path of travel of the first magnet,
   a magnetic coil wrapped around at least one of the magnets, the magnetic coil countering a magnetic effect of the at least one magnet upon energizing of the coil.

31. A device for selectively reducing the probability of rotation of a spindle motor and disk(s) in a disk drive, the drive having a disk rotatably coupled to a housing and a motor for rotating the disk, comprising:
   a first magnet coupled to at least one of a spindle, clamp and motor coupled to a disk; and
   a second magnet for selectively creating a magnetic coupling with the first magnet for reducing the probability of rotation of the disk;
   wherein the second magnet is selectively displaced from alignment with a path of travel of the first magnet,
   wherein the clamp is injection molded, wherein the first magnet is integrated into the injection molded clamp.

32. A disk drive, composing:
   a housing;
   a spindle rotatably coupled to the housing;
   a disk coupled to the spindle;
   a motor for rotating the spindle and disk;
   a first magnet coupled to at least one of the spindle, a clamp and a motor coupled to the disk;
   a second magnet for selectively creating a magnetic coupling the first magnet for reducing the probability of rotation of the disk; and
   a nonmagnetic counterweight coupled to the at least one of the spindle, clamp and motor, the counterweight being for counterbalancing a centrifugal effect of the first magnet.

* * * * *

UNITED STATES PATENT AND TRADEMARK OFFICE
CERTIFICATE OF CORRECTION

PATENT NO. : 7,187,517 B2 Page 1 of 1
APPLICATION NO. : 10/742093
DATED : March 6, 2007
INVENTOR(S) : Feliss et al.

It is certified that error appears in the above-identified patent and that said Letters Patent is hereby corrected as shown below:

col. 5, line 65 change "second magnet selectively" to --second magnet for selectively--;
col. 6, line 6 change "disks)" to --disk(s)--:
col. 6, line 7 change "chive" to --drive--;
col. 6, line 14 change "art" to --an--;
col. 6, line 39 change "rotating the disk comprising;" to --rotating the disk, comprising:--;
col. 7, line 6 change "dive" to --drive--;
col. 7, line 9 change "disks" to --disk--;
col. 7, line 18 change "rotating the disk comprising" to --rotating the disk, comprising--;
col. 7, line 19 change "spindle clamp" to --spindle, clamp--;
col. 7, line 52 change "spindle clamp" to --spindle, clamp--;
col. 8, line 4 change "rotation motor" to --rotation of a spindle motor--;
col. 8, line 14 change "actuated by solenoid." to --actuated by a solenoid,--;
col. 8, line 34 change "drive having" to --disk drive having--;
col. 8, line 45 change "composing" to --comprising--;
col. 8, line 53 change "coupling the first magnet" to --coupling with the first magnet--.

Signed and Sealed this

Twenty-fourth Day of April, 2007

JON W. DUDAS
*Director of the United States Patent and Trademark Office*